US006988980B2

(12) United States Patent
Moss

(10) Patent No.: US 6,988,980 B2
(45) Date of Patent: Jan. 24, 2006

(54) SEPARATOR WITH BEARING LUBRICATION ARRANGEMENT

(75) Inventor: Reinhard Moss, Ennigerloh (DE)

(73) Assignee: Westfalia Separator AG, (DE)

( * ) Notice: Subject to any disclaimer, the term of this patent is extended or adjusted under 35 U.S.C. 154(b) by 0 days.

(21) Appl. No.: 10/931,459

(22) Filed: Sep. 1, 2004

(65) Prior Publication Data

US 2005/0065010 A1 Mar. 24, 2005

Related U.S. Application Data

(63) Continuation of application No. PCT/EP03/02752, filed on Mar. 17, 2003.

(30) Foreign Application Priority Data

Mar. 22, 2002 (DE) ............................ 102 12 808

(51) Int. Cl.
*B04B 9/00* (2006.01)
(52) U.S. Cl. .................... 494/15; 494/83; 184/6.18
(58) Field of Classification Search ............... 494/15, 494/83, 84; 184/6.18; 384/465, 472–474
See application file for complete search history.

(56) References Cited

U.S. PATENT DOCUMENTS

| 1,608,413 | A | * | 11/1926 | Mortensen | .................. | 184/6.18 |
|---|---|---|---|---|---|---|
| 3,177,044 | A | * | 4/1965 | Goergen | ..................... | 384/415 |
| 3,327,938 | A | * | 6/1967 | Stallman | ....................... | 494/15 |
| 3,765,688 | A | | 10/1973 | Junker | | |
| 4,457,745 | A | * | 7/1984 | Broker et al. | .................. | 494/15 |
| 4,654,023 | A | * | 3/1987 | Foldhazy | ...................... | 494/15 |
| 5,848,959 | A | * | 12/1998 | Droste et al. | .............. | 184/6.18 |
| 6,117,063 | A | * | 9/2000 | Szepessy et al. | ........... | 384/476 |
| 6,228,016 | B1 | * | 5/2001 | Kristensen et al. | ........... | 494/83 |
| 6,267,204 | B1 | * | 7/2001 | Kristensen et al. | ........ | 184/6.18 |
| 6,578,670 | B1 | * | 6/2003 | Klintenstedt et al. | ....... | 384/465 |
| 6,626,814 | B1 | * | 9/2003 | Setterberg | ..................... | 494/15 |
| 2004/0192532 | A1 | * | 9/2004 | Mackel et al. | ................ | 494/15 |
| 2005/0065010 | A1 | * | 3/2005 | Moss | .......................... | 494/15 |

FOREIGN PATENT DOCUMENTS

| DE | 825575 | | 12/1951 |
|---|---|---|---|
| DE | 1285412 | | 12/1968 |
| DE | 1286785 | | 1/1969 |
| DE | 1809082 | * | 6/1970 |
| DE | 19747127 | | 5/1998 |
| EP | 0054502 A1 | * | 6/1982 |
| EP | 0215585 A1 | * | 3/1987 |
| WO | WO9857751 | | 12/1998 |
| WO | WO9857752 | | 12/1998 |

* cited by examiner

Primary Examiner—Charles E. Cooley
(74) Attorney, Agent, or Firm—Gauthier & Connors LLP

(57) ABSTRACT

A separator comprising a centrifugal drum driven by a centric spindle mounted with at least one axial bearing on a machine frame and a barrier chamber for hydrohermetic sealing an oil layer inside the barrier chamber. The barrier chamber has an immersion plate therein and is disposed in the axial region between the at least one bearing and the centrifugal drum around the spindle.

17 Claims, 4 Drawing Sheets

SEPARATOR WITH BEARING LUBRICATION ARRANGEMENT

PRIORITY INFORMATION

This application is a continuation of International Patent Application PCT/EP03/02752, filed on Mar. 17, 2003, which claims priority to German Patent Application DE10212808.1, filed on Mar. 22, 2002 both of which are included herein by reference in their entirety.

BACKGROUND OF THE INVENTION

1. Field of Invention

This invention relates to a separator in which the vessel with the centrifugal drum forms the hood region of the centrifuge. The centrifugal drum with its vertical rotational axis is set on a spindle, which is supported on a machine frame, for example with an upper bearing and a lower bearing axially offset thereto. The region of the bearings is to be construed as belonging to the gearing region of the separator. A problem is posed by the sealing between the gearing region and the hood region, because the spindle extends continuously from the centrifugal drum in the hood region into the gearing region. In the prior art, the required sealing on the spindle is implemented for example with contact seals.

2. Description of Prior Art

DE 1 285 412 shows an ultracentrifuge whose rotor runs on a vacuum chamber. Two plain bearings serve for support, accommodating the radial forces of the structure, a disk is located between the plain bearings as a thrust bearing. Lubricating oil is delivered under pressure via a line. The support is formed by the totality of the housing with the spindle, the disk, and the upper bearing point.

According to DE 1 286 785, a stuffing box system in a vacuum centrifuge is supplied with lubricating oil from an overhead reservoir and, via a chamber, conveyed by gravity in the reservoir and line.

U.S. Pat. No. 3,765,688 shows a fluid seal for a high-speed shaft of a centrifuge.

DE 825 575 shows a spindle support with two roller bearings, which are supplied with lubricating oil from a sump with a self-priming system.

In WO 9857752 and WO 9857751, lubricating oil is admitted below the bearing of the spindle. This design does not include a separation between drive system, in particular between the bearing compartment and the drum compartment.

SUMMARY OF THE INVENTION

The goal of the invention is to implement, in a fashion, simple in terms of design, sealing that is reliable and not subject to wear problems between the gearing region and the hood region.

The invention achieves this goal through a separator having a centrifugal drum arranged in a vessel whose rotational axis is oriented vertically and which is drivable by a central spindle that is supported on a machine frame with two bearings, wherein a barrier chamber for hydrohermetic sealing by an oil layer is fashioned around the spindle, at least segmentally, in the axial region between the upper bearing and below the centrifugal drum, an immersion plate is arranged in the barrier chamber. The barrier chamber has a connection to a passage in which the two bearings are axially arranged so that the oil is led on out of the barrier chamber to the bearings for lubrication.

The oil delivered to the bearings—for external lubrication—is preferably used as a barrier medium, which oil is initially led through the barrier chamber and there forms a sealing oil layer before it is led out of the barrier chamber to the bearings for lubrication. An additional barrier medium such as water is not necessary. The oil layer that forms in the barrier chamber when the centrifugal drum revolves takes care of reliable sealing in a manner simple in terms of design, without any wear problems. Lubrication of the roller bearing is effected at the same time.

An immersion plate dipping into the oil layer is arranged in the barrier chamber. This immersion plate is preferably equipped with fins on its axial walls. This feature is attractive in particular if the immersion plate rotates along with the spindle in operation and the outer wall or end wall and the two axial walls of the barrier chamber are fashioned so as to be stationary in operation. This design can be implemented with particularly little design effort.

Alternatively, it is also conceivable that the outer wall and the two axial walls of the barrier chamber are fashioned so as to co-rotate with the spindle in operation and the immersion plate is fashioned so as to remain stationary. In this case it is expedient if the axial walls of the barrier chamber are equipped with fins. The immersion plate can then be molded onto a cylindrical machine frame part enclosing the spindle and remaining stationary in operation, and the barrier chamber can be connected to the spindle in the region of its lower axial wall. This embodiment can also be implemented in simple fashion and offers all the other aforementioned advantages.

The barrier chamber especially has a connection to a passage in which the bearings are arranged, so that the bearings (in particular roller bearings) are lubricated in extremely simple fashion via the passage. Two of the bearings—in particular a collar and a step bearing—are arranged axially offset relative to one another in the passage, so that oil is jointly fed to the two bearings and the barrier chamber via a single system in extremely simple fashion.

Further advantageous developments of the invention can be inferred from the remaining dependent claims.

BRIEF DESCRIPTION OF THE DRAWINGS

In what follows, the invention is described in greater detail on the basis of an exemplary embodiment with reference to the drawings, in which.

DETAILED DESCRIPTION OF THE INVENTION

Figure 1:
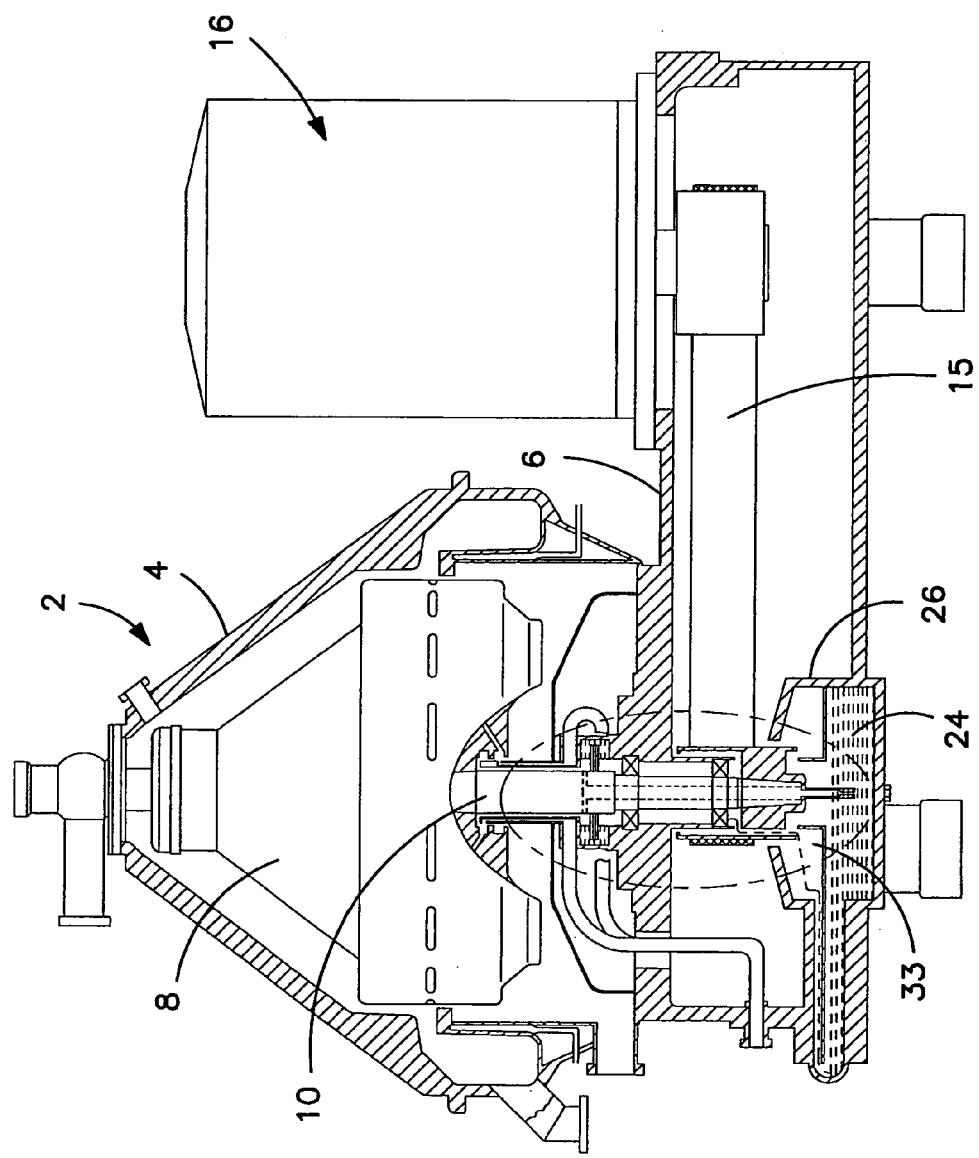
FIG. 1 is a sectional view of a separator in simplified schematic depiction.

FIG. 1 shows a separator 2 with a vessel 4, which is arranged on a machine frame 6. In vessel 4, separator 2 has a centrifugal drum 8 with rotational axis oriented perpendicularly to the floor. Vessel 4 with centrifugal drum 8 forms the hood region of the centrifuge.

The centrifugal drum is set on a spindle 10, which is supported on machine frame 6 in two bearings 12, 14 axially offset relative to one another and drivable with a (flat) drive belt 15, which passes around spindle 10 on the one hand and a driven part of a drive unit 16 on the other hand. The region of the two bearings 12, 14 is associated with the gearing region of the separator. Spindle 10, in its upper region, engages into centrifugal drum 8 with a portion narrowing in wedge fashion.

Because spindle 10 extends from the hood region into the gearing region, reliable sealing of simple design is necessary between these regions. This is effected here by hydrohermetic sealing.

This sealing is effected in that, above upper bearing 12 and below centrifugal drum 8, spindle 10 is enclosed by an annular barrier chamber 18 with a cylindrical outer wall 18a, a disklike upper axial wall 18b, and a disklike lower axial wall 18c. Arranged in barrier chamber 18 is a circular disk-shaped immersion plate 20, which is attached to the outer circumference of spindle 10 and has an outer radius smaller than the radius on the inner side of end wall or outer wall 18a at the larger circumference of barrier chamber 18. In this way, fluid, for example a lubricant, is enabled to flow around immersion plate 20 in the barrier chamber. The immersion plate is equipped with fins 34 running, for example, radially on its two axial walls.

Figure 2:
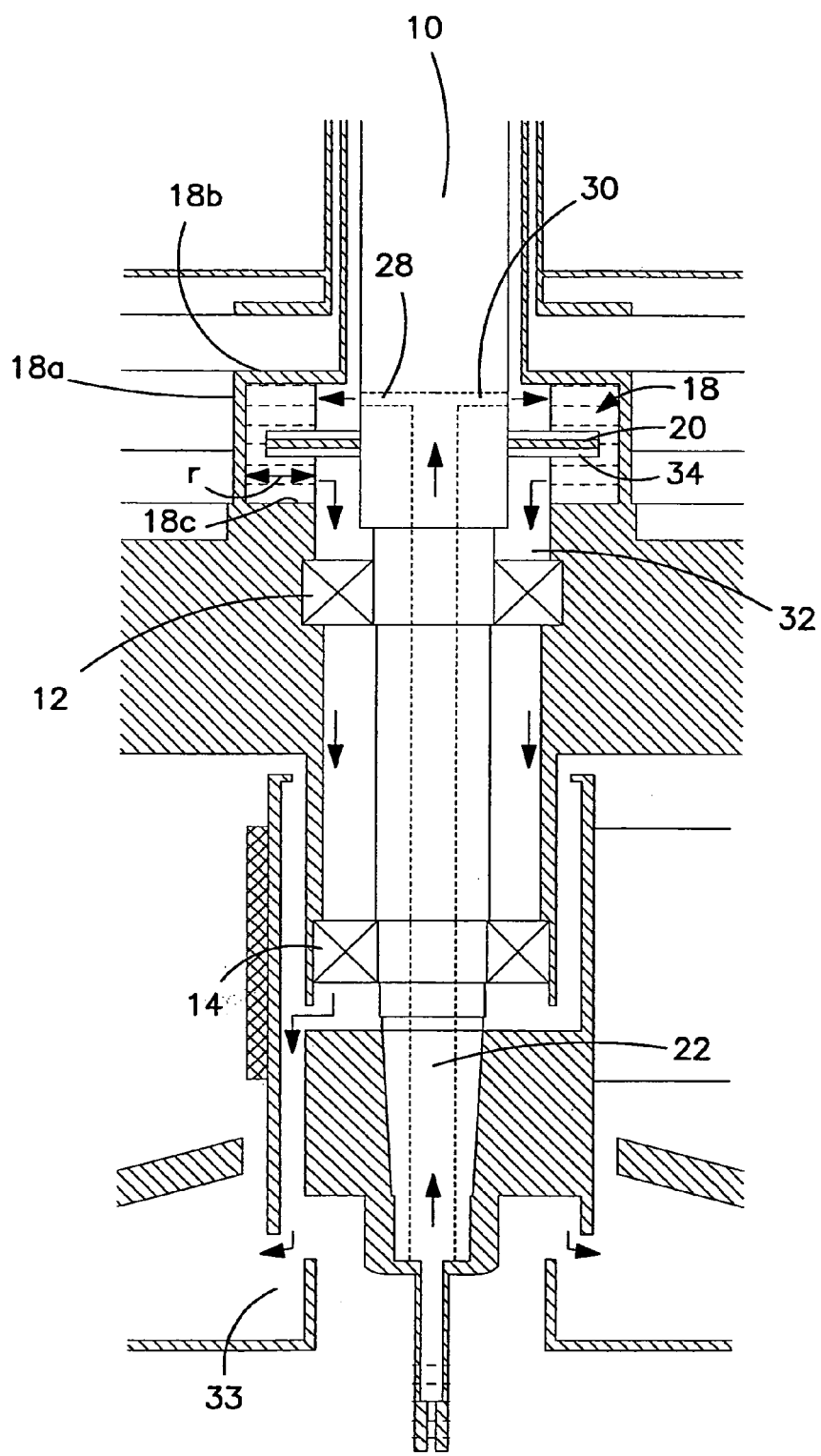
FIG. 2 is a detail of the separator of FIG. 1.
Figure 3:
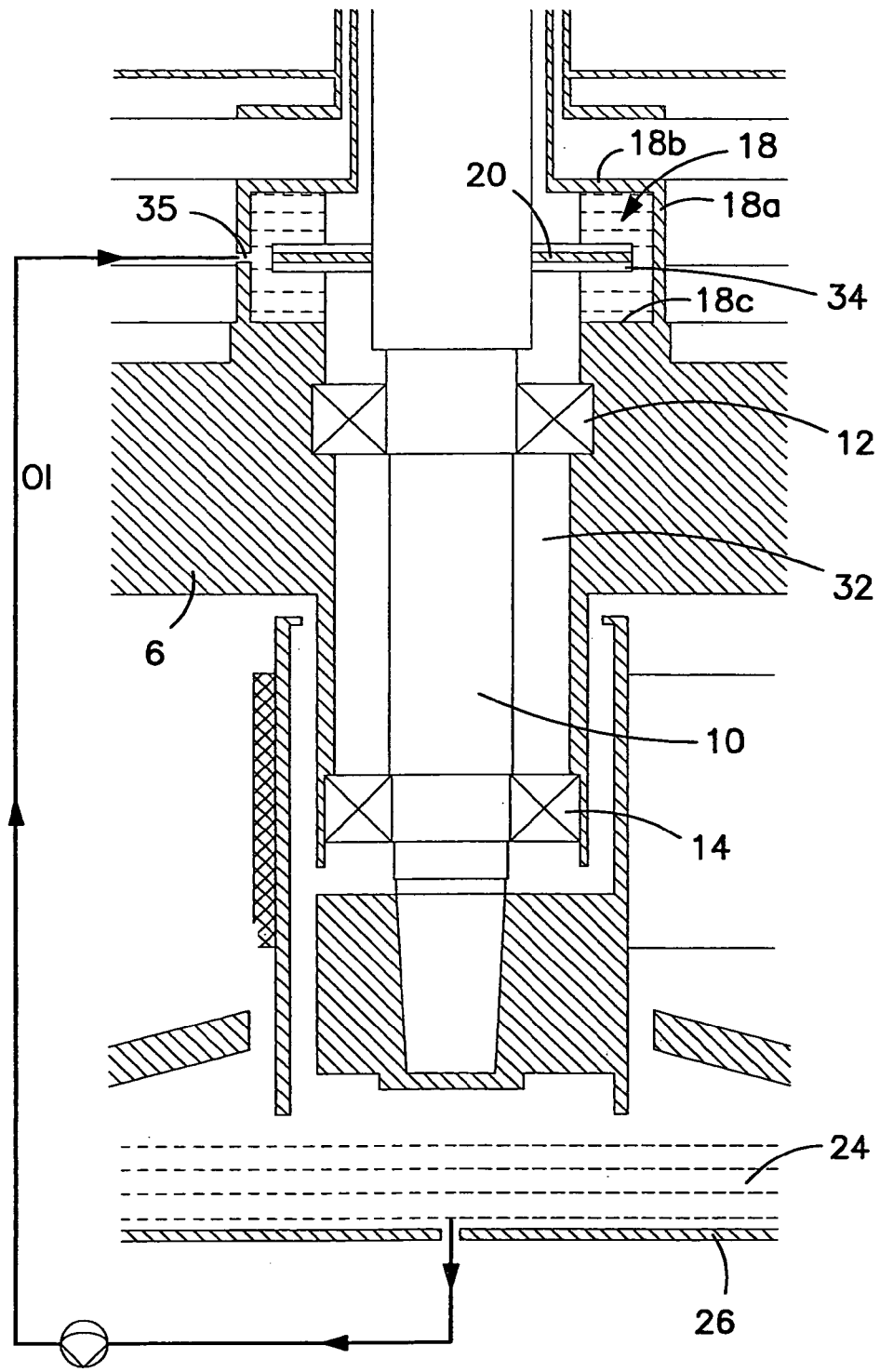
FIG. 3 is a detail of a second separator in simplified schematic depiction.

Because immersion plate 20 in FIG. 1, FIG. 2, and FIG. 3 is connected to spindle 10, it rotates along with spindle 10 when the separator is in operation. Walls 18a, b, and 18c, on the other hand, are connected to or molded onto machine frame 6, so that they are stationary when the centrifuge is in operation.

Spindle 10, which is equipped with a central hole 22, has its lower end, which faces away from centrifugal drum 8 and is reduced in diameter—here stepped twice—dipping into an oil sump 24 in a reservoir 26. Hole 22 extends centrally axially through spindle 10 as far as radial distributor ducts 28, 30, which open radially into barrier chamber 18 in the region above immersion plate 20.

At its lower end, barrier chamber 18 opens inwardly toward spindle 10 into a passage—here in the shape of an annular duct 32 around spindle 10—which extends from barrier chamber 18 to a return flow region 33 into reservoir 26 for oil sump 24 and in which the two bearings, axially offset relative to one another, are so arranged that they are lubricated by the oil in the passage.

The function of this arrangement according to FIG. 1 is as follows.

When centrifugal drum 8 revolves, oil from oil sump 24 is conveyed through hole 22 into distributor ducts 28, 30 and from there into barrier chamber 18. There, by the rotation of spindle 10 and by fins 34 on immersion plate 20, which is rotating along with spindle 10, it is accelerated into the radially outer region of barrier chamber 18 and there forms an oil layer with a radius r—as viewed inwardly from outer wall 18a—into which the outer rim of immersion plate 20 dips.

From barrier chamber 18, the overflowing oil flows into annular duct 32, where it lubricates bearings 12 and 14 before flowing back into return flow region 33 of reservoir 26 and from there into oil sump 24.

Thus the lubrication required for bearings 12, 14 is advantageously also utilized for hydrohermetic sealing on the spindle above bearing 12.

A first alternative embodiment is shown in FIG. 3. Here the oil is led radially from outside into the barrier chamber through a hole 35 in outer wall 18a of barrier chamber 18, for example by a pump apparatus. In other respects the design and function correspond to the exemplary embodiment of FIG. 1.

Alternatively—not depicted here—it is also conceivable to deliver the oil to hole 35 by an external oiling system and recycle the draining oil into a reservoir of the oiling system.

Figure 4:
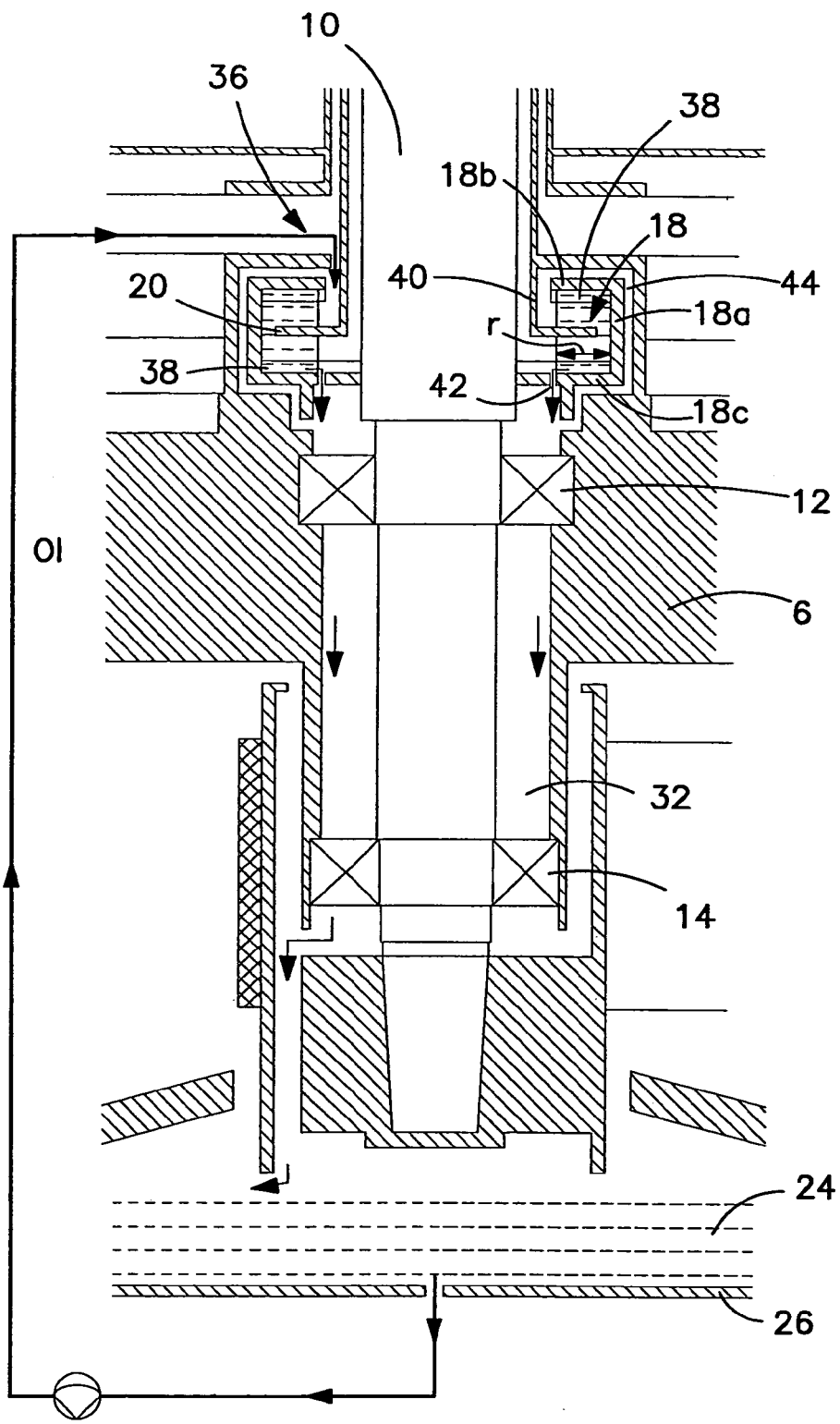
FIG. 4 is a detail of a third separator in simplified schematic depiction.

A second alternative embodiment is shown in FIG. 4. Here the oil is led not through spindle 10 but radially from outside into a short annular duct 36 above the barrier chamber around spindle 10, which annular duct opens below into the radially inner region of barrier chamber 18, which is equipped with fins 38, running radially for example, in the region of its axial walls 18b, c. Immersion plate 20 is here fashioned so as to be stationary and is molded onto a cylindrical machine frame part 40 that encloses the spindle but is stationary in operation. Barrier chamber 18, in contrast, is connected to spindle 10 in the region of its lower axial wall 18c, so that the two axial walls 18b and c and outer wall 18b co-rotate with spindle 10 in operation. Passages 42 in lower axial wall 18c of barrier chamber 18 permit the penetration of oil into annular duct 32. At its outer circumference, barrier chamber 18 is enclosed by an annular compartment 44 through which oil can likewise flow into annular duct 32 with bearings 12 and 14.

When centrifugal drum 8 revolves, oil from oil sump 24 is conveyed into barrier chamber 18. There, by the rotation of the barrier chamber walls 18a–c and of fins 38 on the axial walls, it is accelerated into the radially outer region of barrier chamber 18 and there once again forms an annular oil layer with a radius "r" into which the outer rim of immersion plate 20' dips. In this way, hydrohermetic sealing is once again implemented.

What is claimed is:

1. A separator having
   a) a centrifugal drum arranged in a vessel whose rotational axis is oriented vertically and
   b) which is drivable by a central spindle that is supported on a machine frame with two bearings, wherein
   c) a barrier chamber for hydrohermetic sealing by an oil layer is fashioned around the spindle, at least segmentally, in the axial region between the upper bearing and below the centrifugal drum,
   d) an immersion plate is arranged in the barrier chamber,
   e) the barrier chamber has a connection to a passage in which the two bearings are axially arranged so that the oil is led on out of the barrier chamber to the bearings for lubrication.

2. The separator according to claim 1, wherein the rotational axis of the centrifugal drum is oriented vertically and the centrifugal drum is set onto the spindle from above.

3. The separator according to claim 1, wherein the barrier chamber is connected to an oil sump and arranged above the at least one bearing.

4. The separator according to claim 1, wherein the immersion plate has fins on its axial walls.

5. The separator according to claim 1, wherein the immersion plate is fashioned as an element co-rotating with the spindle in operation.

6. The separator according to claim 1, wherein the immersion plate is fashioned as an element that is stationary in operation.

7. The separator according to claim 1, wherein the barrier chamber encloses the spindle in annular fashion and has an outer wall and an upper and a lower axial wall.

8. The separator according to claim 7, wherein the outer wall and the two axial walls of the barrier chamber are fashioned so as to be stationary in operation.

9. The separator according to claim 7, wherein the outer wall and the two axial walls of the barrier chamber are fashioned so as to co-rotate with the spindle in operation.

10. The separator according to claim 7, wherein the axial walls of the barrier chamber are equipped with fins.

11. The separator according to claim 1, wherein the spindle is provided with a central hole and has its end facing away from the centrifugal drum dipping into the oil sump, the central hole extending axially through the spindle as far as at least one radial distributor duct, which opens into the barrier chamber above the immersion plate.

12. The separator according to claim 11, wherein the central hole is fashioned so as to narrow toward the oil sump.

13. The separator according to claim 1, wherein the bearings are fashioned as roller bearings.

14. The separator according to claim 1, characterized by a hole in the outer wall of the barrier chamber for the delivery of oil into the barrier chamber.

15. The separator according to claim 14, wherein oil is fed to the hole from the oil sump or by an external oiling system.

16. The separator according to claim 1, wherein the immersion plate is molded onto a cylindrical machine frame part enclosing the spindle and stationary in operation and that the barrier chamber is connected to the spindle in the region of its lower axial wall.

17. The separator according to claim 1, wherein the barrier chamber is enclosed at the outer circumference by an annular compartment that is connected to an annular duct.

* * * * *